April 18, 1961 T. J. MALLEY ET AL 2,980,632
ALUMINA OF CONTROLLED DENSITY AND CATALYSTS PREPARED THEREFROM
Filed May 17, 1957
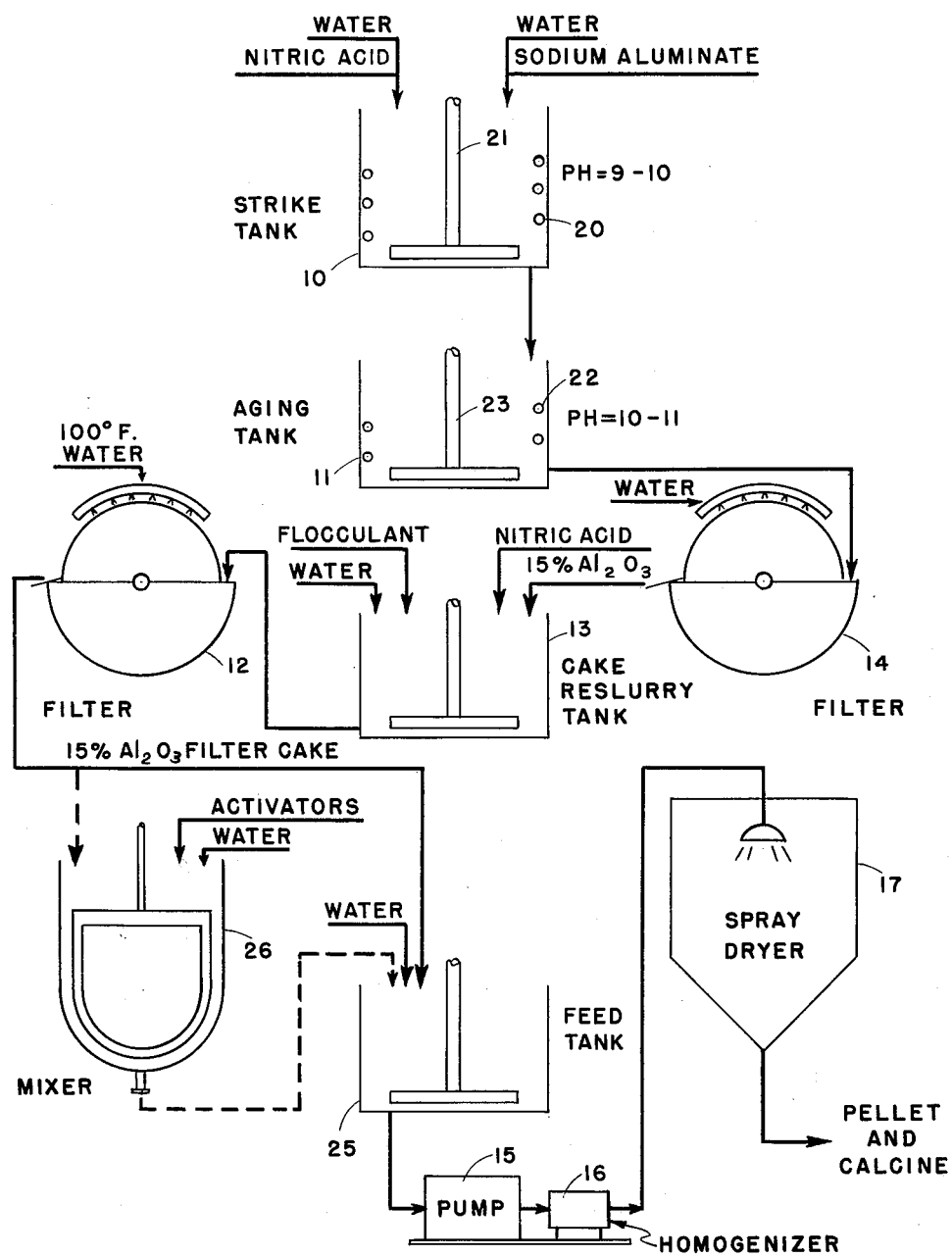

United States Patent Office 2,980,632
Patented Apr. 18, 1961

2,980,632
ALUMINA OF CONTROLLED DENSITY AND CATALYSTS PREPARED THEREFROM

Thomas J. Malley, Stamford, Harvey D. Schindler, Darien, and John D. Pennell, Jr., and William B. Innes, Stamford, Conn., assignors to American Cyanamid Company, New York, N.Y., a corporation of Maine Filed May 17, 1957, Ser. No. 660,000

9 Claims. (Cl. 252—465)

This invention relates to methods of preparing alumina gels and calcined alumina having a predetermined and controlled density, pore volume and surface area and to catalysts prepared from and containing such alumina. The invention also includes certain catalyst compositions in which the catalyst density, pore volume, attrition resistance and other characteristics are controlled to produce optimum performance in particular catalytic processes such as in the dehydrogenation of hydrocarbons, catalytic reforming and hydrodesulfurization of petroleum fractions and the like, and also processes employing these catalysts.

A wide variety of catalysts are now in commercial use in which an activating metal or metal oxide is supported on or impregnated throughout an alumina base. One of the principal objects of our present invention is to provide a manufacturing process for the production of the alumina gels used in making such catalysts that will permit a close and accurate control of the density and porosity of the alumina, and therefore of the finished catalyst. A further object is the provision of such a method that is particularly well adapted for large scale manufacture, including the removal of alkali metal compounds and other impurities from the alumina. A further specific object is to provide improved catalyst compositions containing molybdenum oxide and cobalt oxide impregnated into an active alumina and having a density within the range of about 0.5–0.8 gram per cc. and hydrodesulfurization processes in which such catalysts are employed for the hydrogenation of cyclic sulfur- and nitrogen-containing impurities in hydrocarbons. Additional objects will become apparent from the following description of the invention, including the specific examples, when taken with the appended claims.

The activity of catalysts used in heterogeneous liquid and vapor phase reactions is ordinarily measured on a volume basis. Thus, the term space velocity is used to express the volumes of reagent passing through a given volume of catalyst per hour. The cost of the catalyst, on the other hand, is usually based on its weight. The cost of the quantity of catalyst necessary for a given process can therefore frequently be reduced by reducing the catalyst density. We have discovered a method by which the density of alumina gel-based catalysts can be controlled throughout a wide range, thus permitting the preparation of the most economical and efficient catalysts of this class for any desired purpose.

Alumina of suitable activity for catalytic purposes is frequently prepared by precipitation from a water solution of a water-soluble aluminum compound which may be either an aluminum salt such as aluminum sulfate, aluminum nitrate, aluminum chloride and the like or an alkali metal aluminate such as sodium or potassium aluminate. If hydrated alumina prepared by ordinary precipitation procedures is spray dried a light, fluffy product of low apparent density, usually within the range of about 0.2–0.3 gram per cc., is obtained. We have found that treatment of the precipitated hydrated alumina under controlled conditions of alkalinity, either during its formation or in a subsequent step, or both, will convert it into a form in which it can be densified by homogenization so that dried alumina gels having a higher density can be obtained.

The process of our invention in its broadest aspects therefore comprises the densification of a hydrated alumina which has been made responsive to homogenization either by precipitation from an aqueous solution of a water-soluble aluminum compound under the alkaline conditions hereinafter described, or which has been aged under alkaline conditions at a pH higher than that of its precipitation, or both. This process can be used either to prepare dried alumina gels or calcined alumina of controlled density and surface area for subsequent impregnation with activators such as finely divided platinum or palladium, molybdenum oxide, tungstic oxide or chromium oxides, with or without oxides of cobalt or nickel, or the activating metals or metal compounds may be impregnated into the hydrated alumina before drying and either before or after the homogenizing step. The impregnated alumina gels obtained by drying the hydrated alumina in a current of hot gases, and usually having a total moisture content within the range of about 15–40% as determined by loss on ignition, may be used as catalysts or they may be pelleted and dried by calcination at higher temperatures to obtain more active catalysts having a much lower moisture content.

Hydrated alumina capable of being densified by homogenization can be obtained by precipitation from a water-soluble aluminum compound within a pH range between about 9.0 and 10.5. When these conditions are maintained the alumina is precipitated in a crystalline form in which it can be filtered at reasonably good filtration rates and washed free from contaminants and the alumina particles can be broken down to an increasing extent by increasing the severity of homogenization. The degree of response of the hydrated alumina to homogenization increases with increasing pH values within the above range, but at pH values above 10.5 the formation of slimes is noted and control of density by homogenization is erratic. One of the primary control points in obtaining alumina of controlled density is therefore the adjustment of the hydrated alumina precipitation, or strike, within the indicated range.

The second principal control feature to be used in regulating the density of the dried alumina is the extent or severity of homogenization. Since the most practical and preferred method of compacting the hydrated alumina is by passing it through a homogenizer, this factor can be conveniently and accurately described with reference to an ordinary spring-pressed homogenizing valve. In the present specification and claims the extent of homogenization will therefore be defined as that corresponding to the homogenization obtained by passing the hydrated alumina slurries through such a valve at a defined pressure drop.

Hydrated alumina capable of being densified by homogenization is also obtainable by aging the hydrated alumina slurries under alkaline conditions. We have found that an effective response to homogenization is obtainable by aging these slurries under more strongly alkaline conditions than those used in the alumina precipitation and within the pH range of about 10.0–11.0. While hydrated alumina precipitated from water-soluble aluminum compounds at pH values of from 7.0 to 9.0 can be made responsive to homogenization by aging at pH values within this range, a considerably better response is obtained with slurries of hydrated alumina precipitated in the pH range of 9–10.5. The preferred method of our invention, in obtaining alumina and impregnated alumina catalysts of controlled density, therefore includes the densification by homogenization of hydrated alumina precipitated from water-soluble aluminum compounds at a pH of from 9 to 10.5 and aged at a pH within the range of 10–11. In all cases the aging should be continued for at least 0.25–0.5 hour, and may be continued for 1 hour or longer.

The response of the alumina to comminution can also be increased slightly by controlling the percent of solids in the strike. However if the strike solids are below about 4% the filtering and washing characteristics of the alumina are impaired because of the formation of slimes and it may become difficult or impossible to remove sodium compounds and other impurities to the extent necessary for catalytic purposes. For most purposes the strike solids are therefore maintained between about 5% and 7% with a top limit of about 9%; at higher strike solids the viscosity is such that it is difficult or impossible to maintain uniform pH conditions throughout the strike tank. Efficient and powerful agitation, as by the use of turbine agitators, is particularly desirable at high strike solids to assist in maintaining a pH at a uniform level.

The invention will be further described with reference to the accompanying drawing wherein the figure is a flow sheet on which the apparatus used in producing alumina of controlled density is illustrated diagrammatically.

The equipment consists generally of a strike tank 10, in which hydrated alumina is precipitated, an aging tank 11, filters 12 and 14 for purifying the hydrated alumina connected by a cake reslurry tank 13, a pump and homogenizer 15 and 16, and a spray drier 17. In the strike tank 10 aqueous solutions of a water-soluble aluminum compound and a neutralizing agent are introduced simultaneously in separate streams at rates such that a substantially constant pH is maintained throughout the alumina precipitation. Suitable strike temperatures preferably within the range of 70°–130° F. are maintained by means of cooling coils 20. An agitator 21, which is sufficiently powerful to mix the contents of the strike tank thoroughly and preferably a turbine agitator, is operated during the alumina precipitation, and an initial charge or heel of water should be placed in the tank before the addition of reagents is started. The desired constant pH is maintained by controlling the concentration and rate of addition of the alkaline and acidic reagents. At the end of the strike the alumina slurry may be passed directly to the first filter 14 or it may be held in the aging tank 11, with gentle agitation, for a sufficiently long time to improve its filtering characteristics. If it is desired to increase the response of the alumina slurry to homogenization its pH is maintained between 10 and 11 in the aging tank 11 and the aging time is at least 0.25–0.5 hour. The aging temperature may vary between about 90°–130° F. and is controlled by means of temperature regulating coils 22. The aging is conducted with gentle agitation, preferably by means of a gate or paddle type agitator 23.

Operation of the first filter 14 may vary to some extent with the reagents used in the strike. When sodium aluminate and a mineral acid such as nitric acid are used in the strike tank, as illustrated in the drawing, the filtration temperature is preferably about 100° F., and if the alkali metal content of the filter cake is reduced to a suitable extent, as below 0.02% in the case of hydroforming and hydrodesulfurization catalysts, the cake can be sent directly to a feed tank 25 for homogenization and drying, or it may be introduced into a mixer 26 for admixture with activators such as ammonium molybdate, chromic acid, platinic chloride and the like. When the strike is made with aluminum sulfate and sodium aluminate solutions, however, two or more filtrations and washings are usually needed to remove impurities from the hydrated alumina to the desired extent, and therefore the washed cake from the filter 14 is passed into the cake reslurry tank 13 and suspended in water. Sufficient nitric acid to bring the pH of the suspension to about 6–8 may be added in this tank and a flocculant such as glue, polyacrylamide, and the like may also be added to improve filtration characteristics if desired. Such flocculants may be added before the first filtration if desired. The resulting slurry is then filtered on the second filter 12 and washed with pure water, preferably having a temperature in the neighborhood of 100° F. The resulting filter cake is then introduced into the tank 25, either directly or after admixture with one or more activators in the tank 26.

Alumina slurry from the tank 25, which may have an $Al_2O_3$ content of 6–20% and may contain the quantities of activators desired in the finished catalyst is passed through suitable homogenizing and grinding mechanism. The type indicated on the drawing by reference numerals 15 and 16 consists of a high pressure pump followed by a homogenizing valve. The pump, which is preferably of the piston type, should be capable of generating pressures up to about 3000 lbs. per square inch, and the pressure drop across the homogenizing valve should be adjustable so that the extent of homogenizing can be controlled. It is in this homogenizer that the hydrated alumina, preconditioned for response to homogenization by the pH conditions in the tanks 10 or 11 and if desired by the strike solids and aging times, is brought to the controlled density desired in the finished catalyst.

The homogenized alumina slurry may be dried by any suitable means, as in a tray drier or a rotating kiln in contact with hot gases. In accordance with another important feature of our invention, however, it is preferably introduced into the spray drier 17 and set to a gel while suspended in a current of hot gases. By spray drying the homogenized slurry we obtain an alumina gel in the form of microspheres having a highly uniform particle size in addition to their controlled density. We therefore obtain an alumina product having a solids content of about 60–80% and a moisture content of about 20–40% that can be used for a wide variety of purposes. It can be admixed with promoting metal compounds such as those described above, or if promoters or activators have been incorporated with the hydrated alumina in the mixer 26 it can be pelleted and calcined to form a finished catalyst. Any suitable spray drier may be used; one that has been employed with good results is described in U.S. Patent No. 2,644,516, dated July 7, 1953. Although gas inlet temperatures up to 1300° F. have been used successfully the temperature of the drying gases entering the spray drying chamber is preferably controlled within the range of about 500°–1000° F. so that the hydrated alumina will be converted into a set, partially dehydrated gel during the drying procedure. This gel, after pelleting, may be fully dehydrated by calcining it in a rotary kiln at temperatures of about 1100°–1350° F. for times up to about 4–5 hours.

The above-described principles of our invention may be applied to advantage for the production of a wide variety of catalysts as well as for the manufacture of alumina gels and calcined alumina for other purposes. The partially dried alumina gel may be coated or impregnated with from about 8% to 20% of more of molybdenum oxide by soaking or grinding with an ammonium molybdate solution, followed by pelleting and calcination; excellent hydroforming catalysts of controlled density and surface area are obtained by this procedure. If a platinum-containing reforming catalyst is desired, the hydrated alumina gel may be impregnated with platinic chloride solution by the same procedure, with or without subsequent treatment with hydrogen sulfide or ammonium sulfide solution to precipitate the platinum. If desired, these catalysts may be further activated by the incorporation of hydrofluoric acid, hydrochloric acid or aluminum chloride in small amounts. Such catalysts preferably contain about 0.1–0.8% by weight of platinum and up to 3% of combined halogen, the balance being substantially all alumina.

As has been indicated above, a particular specific object of our invention is to provide improved hydrodesulfurization catalysts having a density within the range of about 0.5–0.8 gram per cc. These catalysts may contain molybdenum oxide in proportions of about 8–25% and about 1–5% of cobalt oxide on the weight of the finished catalyst. In accordance with the process of our invention a hydrated alumina is precipitated from a water-soluble aluminum compound while maintaining a pH in the strike tank of 9–10.5, washed free from water-soluble impurities and impregnated by adding the requisite quantities of ammonium molybdate and cobalt nitrate in the mixer 26. The resulting hydrated alumina mixture is then comminuted in the homogenizer 16 and spray dried in the drier 17 and may be pelleted and calcined at temperatures of 1150°–1350° F. for about 1–4 hours. If desired, the density of the finished catalyst may be further controlled by aging the hydrated alumina slurry at a pH between 10 and 11 for 0.5–1 hour or longer. Alternatively, if desired, the strike may be carried out at a constant pH within the range of 7–9 and the density response to homogenization obtained by aging the resulting hydrated alumina slurry in the range of 10–11 and preferably between about 10.4 and 11 for 0.25–1 hour or longer.

We have noted that the response to homogenization of mixtures of the indicated quantities of ammonium molybdate and cobalt nitrate with hydrated alumina precipitated or precipitated and aged in the pH ranges described above is not as great as that of hydrated alumina itself. Thus, for example, a hydrated alumina precipitated from sodium aluminate and aluminum sulfate at a constant pH of 7.0 and aged for 0.5–1 hour at a pH of 10.8 produced a spray-dried product having an apparent bulk density of 0.47 gram per cc. after homogenization at a pressure drop of 1000 p.s.i.g. The same alumina, after admixture with ammonium molybdate and cobalt nitrate in quantities such as to produce a finished catalyst containing 15% $MoO_3$ and 3% $CoO$, the balance being substantially all alumina, formed a spray dried product having an A.B.D. of 0.42 gram per cc. after homogenization at a pressure drop of 2000 p.s.i.g. In preparing catalysts of this type, in which the activating metal compounds are mixed with the alumina prior to homogenization, it is therefore advisable to conduct preliminary homogenization and spray drying tests on the catalyst mixtures themselves.

The manner in which the principles of our invention may be applied for the production of other catalysts, and the advantageous characteristics of such catalysts, are described in the following examples.

EXAMPLE 1

Spray dried alumina was prepared by the above-described process using as reagents a sodium aluminate solution containing 29% $Al_2O_3$ and 31% aqueous nitric acid. A heel of water was placed in the strike tank 10, the agitator was started and stoichiometrically equivalent quantities of the aluminate and acid solutions were run in simultaneously along with sufficient water to maintain the solids at 7% and at rates such as to maintain pH values in the tank between 9.0 and 10.0, while the strike temperature was maintained between 80° and 120° F. by means of the cooling coils. The slurry was then dropped into the aging tank 11, the pH was adjusted to 7.0 and the batch was aged for 30 minutes at about 100°–120° F. It was then filtered and the filter cake was washed at the same pH using three displacements of 100° F. deionized water.

Portions of the washed filter cake were pumped directly into a spray drier while other portions were homogenized by passage between a spring-pressed homogenizing valve and its seat, the extent of homogenization being controlled by adjustment of the spring. In the spray drier the slurry was injected through stationary nozzles into a descending rotating column of gas having an inlet temperature of about 600°–700° F. and outlet temperature of about 250° F. and dried to a heat-set gel having a moisture content of about 20–25%, as measured by loss on ignition.

When the pH of the strike was 9.1 the apparent bulk density of the spray dried unhomogenized alumina was 0.2 gram per cc. This was increased to 0.3 by homogenizing at 2000 lbs. pressure drop across the homogenizing valve. With a strike pH of 9.3 the A.B.D. of the spray dried material was 0.24 without homogenization and 0.60 after homogenizing at 2000 lbs.

EXAMPLE 2

Spray dried alumina was also prepared by the process described in Example 1 using a corresponding quantity of aluminum sulfate solution as the acidifying agent instead of nitric acid. These reagents were added simultaneously to a heel of water in the strike tank 10 together with sufficient water to maintain the strike solids at 7% while holding the temperature between 80° and 110° F. The rates of addition were such that the strike pH was constant at 9.5.

Two filtrations were used in order to remove both the combined sulfate and the sodium ions. The first filter 14 was washed with three displacements of ammoniacal water having a pH of about 8–9 to decompose basic aluminum sulfate. The filter cake was reslurried in water in the reslurry tank 13 to a 7% solids content and its pH was adjusted to about 7.0 using nitric acid to avoid the introduction of more sulfate. The alumina slurry was then passed over the second filter 12 and washed with three displacements of pure water. The filter cake was pumped into the feed tank 25 and part of the slurry was homogenized and spray dried as in Example 1 and its A.B.D. (in grams per cc.) was determined. The remainder was spray dried under the same conditions without comminution.

The A.B.D of the alumina homogenized at 550 lbs. pressure drop was 0.65; with 1000 lbs. homogenizing pressure it was 0.86. The portion dried without homogenizing had an A.B.D. of 0.35.

EXAMPLE 3

Several batches of hydrated alumina were precipitated from stoichiometrically equivalent quantities of sodium aluminate and aluminum sulfate solutions by the procedure of Example 2 while maintaining the strike solids at 7%, the temperature at about 110°–120° F. and a constant pH between 7.0 and 10.5. At the end of the strike the flow of aluminum sulfate solution was reduced, so that the slurry pH was higher, and the batches were run into the tank 22 and aged at about 100° F. for 0.5–1 hour. They were then filtered and washed as in Example 2 and pumped through the homogenizing valve 16 into the spray drier 17 and dried under the conditions described in Example 1.

The pH at which the slurries were aged and its effect on the purity and A.B.D. of the spray dried alumina at varying pressure drops across the homogenizing valve is shown in the following table:

Table 1

| Aging, pH | Residual, Percent | | A.B.D. at Pressure (p.s.i.) | | |
|---|---|---|---|---|---|
| | $Na_2O$ | $SO_4$ | None | 1,000 | 2,000 |
| 10.2 | 0.00 | 0.00 | 0.24 | | 0.32 |
| 10.7 | 0.03 | 0.07 | 0.53 | 0.86 | |
| 11.0 | 0.04 | 0.15 | 0.56 | 0.94 | 0.95 |

These results, which were obtained with a strike pH of 9.3, indicate that hydrated alumina prepared by precipitation was aqueous solution of water-soluble aluminum compounds can also be converted by aging into a condition in which it is densified by homogenization. Our experiments have shown, however, that this density response to homogenization is obtained only when the aging pH is higher than that of the strike. If the alumina has been overly slimed by too high a pH in the strike tank, either locally because of inadequate mixing or because the pH throughout this tank is above about 10.5, the condition cannot be corrected by aging at a lower pH value.

Portions of the alumina slurry of Example 2 were also aged for 30 minutes at varying pH values, filtered and washed, and spray dried with and without homogenization; Table 2 shows the condition used and the results obtained.

Table 2

| Aging pH | Residual, Percent | | A.B.D. at Pressure (p.s.i.) | | |
|---|---|---|---|---|---|
| | Na$_2$O | SO$_4$ | None | 1,000 | 2,000 |
| 10.0 | 0.03 | 0.06 | 0.39 | 0.56 | 0.74 |
| 10.2 | 0.016 | 0.15 | 0.48 | 0.78 | 0.95 |
| 11.0 | 0.04 | 0.00 | 0.62 | 0.88 | 0.96 |

When the strike was carried out at a pH of 7.0 and 7% solids and the batch was aged at 100° F. and a pH of 10.6 for 0.5–1 hour the A.B.D. of a sample of the alumina spray dried without homogenization was 0.32. This was increased to 0.47 by homogenizing at 1000 p.s.i.g. This and other test results show that homogenization will densify hydrated alumina precipitated in the pH range from 7–9.0 when it has been aged at pH values in the range of about 10.4 to 11.0 for about 0.25–6 hours; longer times including overnight aging (16 hours) may of course be used if desired but are seldom necessary. The aging does not appear to be affected by varying the aging temperatures within the range of about 60°–130° F.

It will also be understood from the above-described test results that the density increase upon homogenization of hydrated alumina precipitated in the pH range of 9.0 to about 10.5 is further increased by aging it for the same times at a higher pH within the range of 10.0–11.0 and at the same temperatures.

Homogenizing pressures up to about 3000 lbs. per square inch may be used, and pressures in the range of about 500–2500 p.s.i. are usually employed. These figures represent the pressure drop across the homogenizing valve.

EXAMPLE 4

This example shows the application of the principles demonstrated in Examples 1 and 2 for the preparation of alumina-base catalsyts wherein a low density, with a corresponding high volume activity, are desired. Catalysts of this type are the chromia-alumina catalysts containing about 1% to 30% of Cr$_2$O$_3$, which are used for organic dehydrogenation reactions, and alumina-molybdena catalysts containing about 8% to 20% of MoO$_3$ that are used in hydroforming petroleum fractions boiling in the gasoline range.

In accordance with one feature of our invention such catalysts are made by spray drying a uniform slurry of hydrated alumina and an activating metal compound, such as chromic acid or ammonium molybdate, and pelleting the spray dried product. Good yields in the spray drying step and good flow properties at the tableting machines are dependent to a considerable extent on the particle size of the spray dried material. Too fine and too light a powder cannot be collected to good yields in the spray drier cyclones and does not feed evenly from the hoppers to the feed frame and dies of an automatic pelleting machine.

In order to obtain a pelleted catalyst of low density it is necessary to prepare the hydrated alumina in such a way that its response to homogenization, which maintains a uniform particle size in the spray dried mixture, is not too great. The alumina is therefore precipitated and aged under pH conditions such as to obtain an apparent bulk density of about 0.40 in the spray dried material; this will produce an A.B.D. of about 0.65–0.72 in the final catalyst pellets.

A low density alumina base is prepared as follows:

To a turbine-agitated strike tank containing a water heel of 78 gallons there is simultaneously added, in separate streams, 231 lbs. of a sodium aluminate solution containing 29% Al$_2$O$_3$ and 454 lbs. of an aqueous aluminum sulfate solution containing 5.8% Al$_2$O$_3$ at rates such as to maintain in the tank a constant pH between 9.3 and 9.5 while controlling the strike temperature to a maximum of 120° F. by cooling coils. At the end of the strike the flow of alum solution is reduced to allow the pH to rise to 10.0 and the slurry is aged for 30 minutes at this pH. It is then dewatered on a vacuum filter and the filter cake is washed with three displacements of water. It is then repulped to 7% solids by the addition of 400 lbs. of water to 400 lbs. of the wet filter cake, the pH is adjusted to 7.0 by adding 10–14 lbs. of 31% nitric acid and the slurry is again aged 30 minutes, dewatered and the filter cake is washed with pure water. The cake contains 13.2% Al$_2$O$_3$, 0.027% Na$_2$O and 0.06% sulfate.

The following procedure is used for making a pelleted 20% Cr$_2$O$_3$ catalyst from this base.

To 300 lbs. of the washed filter cake add 86.7 lbs. of 15% chromic acid solution while agitating vigorously. After the chromic acid solution is thoroughly impregnated into the alumina the slurry is homogenized and dried by nozzle atomization into a spray drier having an inlet gas temperature of 500–600° F. For alumina made at a pH of 9.5 a net pressure drop of 700 lbs. across the homogenizer valve will produce a dried product of 0.40 gram per cc. This spray dried material is mixed with about 1% of graphite or other die lubricant and pelleted to ⅛-inch to ⅜-inch diameter pellets on an automatic tableting machine. The raw tablets are calcined by heating to about 1100° F. during about 2 hours and holding at this temperature for an additional one hour. Their apparent bulk density after calcining is 0.66 gram per cc.

Low density pellets containing molybdenum oxide are made by the same procedure. For an 11% MoO$_3$ hydroforming catalyst 31.5 lbs. of ammonium molybdate solution containing 15% molybdenum oxide are added with vigorous agitation to 300 lbs of the washed alumina filter cake and the resulting slurry is homogenized, spray dried, pelleted and calcined as described above. The A.B.D. of the calcined pellets is 0.65–0.70 gram per cc.

EXAMPLE 5

The attrition resistance of a fluid type alumina gel catalyst increases with an increase in its density up to an A.B.D. of about 1 gram per cc. and therefore catalysts of this type have a relatively high density. Application of the principles of our invention to the production of such catalysts is illustrated by the following procedures.

In order to make a high density alumina base the strikes shown in Examples 1 and 2 are carried out at pH values of about 9.5 to 10.5 and the slurry is aged for at least one-half hour at a higher pH between 10.2 and 11.0 before the first filtration. When alum and sodium aluminate are used the repulping and second filtration are as described in Example 2.

In preparing a high density microspheroidal catalyst containing 20% of chromium oxide and 80% of alumina and suitable for use in the fluid bed dehydrogenation of butane, propane or ethane the sodium aluminate and alum solutions of Example 2 are reacted as described in that example while maintaining the pH of the strike at 9.5–9.7. After aging at a pH between 10.2 and 10.4 the hydrated alumina is filtered and washed and the filter cake is mixed with chromic acid solution or with a solution of ammonium chromate or ammonium bichromate, all as described in that example.

When the resulting slurry is homogenized the pressure drop across the homogenizer valve is increased to 1000–2000 p.s.i. and preferably is maintained at about 1800 p.s.i. After spray drying to a water content (loss on ignition) of about 25–30% the A.B.D. is about 1.13 to 1.15 and after calcining to 1100° F. for 2 hours its bulk density is from 0.9 to 1.0 and its attrition resistance as determined by the method described in U.S. Patent No. 2,768,125 is about 7% overhead after 45 hours.

The same procedure is used in making a fluidizable 11% $MoO_3$–89% $Al_2O_3$ catalyst but still higher pH values and homogenization pressures are employed because the ammonium molybdate does not have the peptizing action of chromic acid on the hydrated alumina. The strike described in Example 3 is therefore carried out at a pH of 9.9 and the unfiltered slurry is aged for 0.5–1 hour at pH 11. The spray drier feed slurry is homogenized at 1500 to 2200 p.s.i. and the spray dried material is calcined by heating to 1200° F. The A.B.D. of the spray dried product is then 0.96 gram per cc.; after the calcination it is about 0.85 to 0.87.

EXAMPLE 6

Catalysts composed essentially of molybdenum oxide and cobalt oxide on an alumina gel support are used for converting organic sulfur compounds such as mercaptans and thiophenes in petroleum fractions, coal tar fractions and other hydrocarbon oils into hydrogen sulfide by reaction in the liquid or vapor phase with hydrogen. A suitable liquid phase process is described in U.S. Patent No. 2,608,521 while Patent No. 2,325,034 describes a typical vapor phase process.

One of the principal objects of the present invention is to provide hydrodesulfurization catalysts of improved weight activity and low bulk density which are of general utility but are particularly important in operating on high boiling petroleum gas oil fractions. This is accomplished by preparing the catalysts from a hydrous alumina which gives on pelleting, drying and calcining the catalyst a surface area and total pore volume of at least 150 square meters per gram and at least 0.5 cc. per gram, respectively, and an apparent bulk density within the range of 0.5 to 0.8 gram per cc. It has been found that hydrodesulfurization catalysts prepared from hydrous alumina of this type and calcined at temperatures within the range of about 1150°–1350° F. are highly effective for use in decomposing cyclic sulfur-containing and nitrogen-containing impurities in hydrocarbon oils when they contain on a dry basis about 10–25% by weight of molybdenum oxide, expressed as $MoO_3$, and about 1–5% by weight of cobalt oxide, the balance being substantially all alumina.

Catalysts of this type, having the required density range, may be prepared by several procedures. One procedure that has been used successfully on a commercial scale, and which constitutes a specific feature of the invention, is that described in Example 3. In an illustrative manufacturing process a heel of 1250 gallons of water is first placed in the tank 10 and the sodium aluminate solution and aluminum sulfate solution are added in separate streams at rates such as to maintain a pH within the range of 9.5 to 9.9 during the alumina precipitation. The quantity of sodium aluminate, containing 29.5% of $Al_2O_3$, is 360 lbs., and it is added along with 3240 lbs. of dilution water. The quantity of aluminum sulfate, which contains 16.75% of $Al_2O_3$, is 2530 lbs. and it is dissolved in an additional 590 gallons of water before being added to the strike tank 10. By these procedures the solids in the strike tank are maintained at approximately 7% during the alumina precipitation.

The strike tank 10 is equipped with a turbine type agitator 21 and with cooling coils 20 so that uniform mixing of the reagents and adequate temperature control can be obtained. The strike temperature is held between about 115°–125° F. and the agitation is such that the pH conditions throughout the strike tank are within the range indicated.

At the end of the strike the flow of alum solution is reduced so that the pH increases to 10.0–10.4, and the slurry is then transferred to the aging tank 11. In this tank it is held at a pH of 10.0–10.4 and at a temperature of 105°–115° F. for 0.5–1 hour with slow mixing. The alumina slurry is then ready for filtration and washing by the procedure described in Example 2.

The filter cake from the second filter 12, containing about 15% $Al_2O_3$ is transferred to the mixing tank 26 and mixed with cobalt nitrate and ammonium molybdate solutions. In a typical batch 1433 lbs. of the filter cake is placed in the tank and 663 lbs. of a cobalt nitrate solution containing 53 lbs. of cobalt oxide are added during 15 minutes with good agitation. Simultaneously 322 lbs. of ammonium molybdate solution containing 264 lbs. of $MoO_3$ are added. Sufficient mixing is provided to ensure uniform incorporation of the promoters and prevent setting up of the slurry; the product is then transferred to the spray drier feed tank 25.

A homogenizer 16 is mounted in the feed line between the tank 25 and the spray drier 17 and operates both to promote a uniform particle size in the spray dried product and to control its density. The homogenizer is preferably of the valve type and is connected on its inlet side to a high pressure pump 15 such as a Manton-Gaulin piston-type pump capable of delivering pressures up to 3000 lbs. per square inch. The alumina gel slurry from this pump passes outwardly between a spring-pressed valve and its seat and the pressure on this valve, and therefore the effective homogenizing pressure, can be controlled by varying the effective spring pressure. This permits a close control of the degree of homogenization of the alumina gel slurry.

In the spray drier 17 the homogenized slurry is sprayed into a current of hot gases, preferably having an inlet temperature of about 500°–1000° F. and an outlet temperature of 330°–400° F. and dried to a solids content of about 65–80%. The pressure drop across the homogenizer 16 is adjusted so that the apparent bulk density of the catalyst spray dried under these conditions is from about 0.4 to 0.45 gram per cc.; homogenizing pressures within the range of about 500–1000 p.s.i. are usually satisfactory.

The spray dried catalyst is mixed with about 1% of its weight of graphite in a ribbon blender and is then pelleted on a Stokes pelleting machine. Using a depth of fill of ⅝-inch, a compression range of 3.4:1 and a relief pressure of 0.2 ton, pellets having a raw crush strength of about 25–30 lbs. are obtainable. These pellets are calcined by raising their temperature to 1260° F. during 3 hours and holding them at this temperature for an additional 1 hour. After cooling the finished catalyst is ready for packaging and shipping.

A representative catalyst of the invention (catalyst A) has the following specifications:

| | |
|---|---|
| Bulk density, A.B.D. | 0.55–0.80 gram per cc. |
| Surface area, square meters per gram | 200 minimum. |
| Pore volume ($N_2$), cc. per gram | 0.42 minimum. |
| Total pore volume, cc. per gram | 0.5 to 1.2. |
| Volume activity | 90 minimum. |
| Percent $MoO_3$ | 14.5–15.2. |
| Percent CoO | 2.0–3.2. |
| Percent $Na_2O$ | 0.02 maximum. |
| Crush strength, lbs. | 28 minimum. |
| Crush strength after use, lbs. | 20 minimum. |
| Pellet dimensions, inches, diameter and length, usually | 0.185–0.195. |

The volume activity was determined by the following test. A test reactor is charged with a measured volume of the catalyst pellets and a West Texas gas oil containing 1.16% of sulfur is passed through it in admixture with hydrogen. The velocity of the oil vapors through the catalyst and the temperature and reaction pressure are measured and controlled, and the quantity of hydrogen sulfide in the exit gases is determined. The percent of sulfur removed by this procedure at a given space velocity is compared with that produced with a catalyst used as a standard. For example, the minimum volume activity of 90 referred to above means that the percent sulfur removal of a given volume of catalyst was 90% of that of the standard catalyst under the test conditions used. Inasmuch as the new catalysts weigh only about 0.5–0.8 as much as the standard catalyst, their weight activity is considerably greater.

The characteristics and activity of catalysts prepared by this process are shown in Table A. In all cases the percent sulfur removal was determined by the above-described test procedure at 5 VHSV, 700° F. and 7500 s.c.f. per barrel of hydrogen.

*Table A*

| Catalyst No. | Pellet Size, Inches | Percent MoO₃ | Percent CoO | Apparent Bulk Density, g./cc. | Surface Area, M.²/g. | Percent S Removal |
|---|---|---|---|---|---|---|
| B (Standard) | 3/16 x 3/16 | 10 | 3 | 1.00 | 125 | 82 |
| 1 | .12 x .16 | 15 | 3 | .74 | 260 | 89 |
| 2 | 1/8 x 1/8 | 15 | 3 | .58 | 250 | 89 |
| 3 | 1/8 x 1/8 | 14 | 2.8 | .78 | 245 | 89 |
| 4 | 3/16 x 3/16 | 20 | 3 | .73 | 240 | 90 |

The oil used in the tests was a West Texas gas oil having an API gravity of 33.5°, a flash point of 225° F., a sulfur content of 1.15% and a carbon residue (percent wt. on 10% bottoms) of 0.11. The A.S.T.M. distillation was

|  | °F. |
|---|---|
| I.B.P. | 480 |
| 50% | 584 |
| 90% | 630 |

Samples of catalyst A from two batches were also tested for sulfur and nitrogen removal and olefin saturation using a thermal naphtha having the following inspection data:

| | |
|---|---|
| Gravity, ° A.P.I. | 47.6 |
| ASTM gum, mg./100 ml. | 6.0 |
| Boiling range, ° F. | 196–430 |
| Lamp sulfur, wt. percent | 0.43 |
| Sulfur (X-ray emission) | 0.595 |
| Basic nitrogen, p.p.m. | 176.0 |
| Total nitrogen, p.p.m. | 181.0 |
| Mass spectrometer analysis: | |
|    Paraffin, vol. percent | 32 |
|    Olefins, vol. percent | 28 |
|    Naphthenes, vol. percent | 23 |
|    Aromatics, vol. percent | 17 |
| Test conditions: | |
|    Pressure, p.s.i.g. | 750 |
|    H₂ rate, s.c.f., H₂/bbl. | 7500 |
|    VHSV | 5 |

| Catalyst | A.B.D., g./cc. | Temp., °F. | Percent S Removal | Percent N₂ Removal | Olefin Saturation, Percent |
|---|---|---|---|---|---|
| A | 0.75 | 650 | 92 | 81 | 50 |
| A | 0.67 | 705 | 95 | 61 | 47 |
| B (Table A) | 1.00 | 650 | 75 | 54 | 32 |

Catalyst A was also tested over a five day operating period using a heavy vacuum gas oil, the characteristics of which are as follows:

| | |
|---|---|
| Gravity, ° A.P.I. | 23.9 |
| Pour point, ° F. | 85.0 |
| Carbon residue, wt. percent | 0.891 |
| Flash, COC, ° F. | 295 |
| Boiling range, ° F. | 480–860 |
| Total sulfur, wt. percent | 2.62 |
| Total sulfur (X-ray emission) | 2.42 |
| Total nitrogen, p.p.m. | 1400 |
| Test conditions: | |
|    Pressure, p.s.i.g. | 400 |
|    H₂ rate, s.c.f., H₂/bbl. | 3900 |
|    Temp., ° F. | 720 |
|    VHSV | 4.5 |

| Catalyst | VHSV | Sulfur Removal, Percent, Days | | | | | N₂ Removal, Percent After 3 and 4 Days |
| | | 1 | 2 | 3 | 4 | 5 | |
|---|---|---|---|---|---|---|---|
| A | 4.51 | 67 | 79 | 75 | 73 | 73 | 35 |
| B (Table A) | 4.33 | 50 | 59 | 71 | 70 |  | 11 |

What we claim is:

1. A method of producing an alumina-base catalyst of controlled density which comprises precipitating hydrated alumina from an aqueous solution of a water-soluble aluminum compound at a pH of from 9 to 10.5, impregnating said hydrated alumina with an activating metal compound, densifying the impregnated alumina by homogenization and converting it into a dried gel by the application of heat.

2. A method of producing an alumina-base catalyst of controlled density which comprises precipitating hydrated alumina from an aqueous solution of a water-soluble aluminum compound at a pH of from 7 to 9.5, aging the resulting slurry for at least 0.25–0.5 hour at a higher pH within the range of 10–11, impregnating the aged hydrated alumina with an activating metal compound, densifying the impregnated alumina by homogenization and converting it into a dried gel by the application of heat.

3. A method of producing a low density dehydrogenation catalyst which comprises precipitating hydrated alumina from an aqueous solution of a water-soluble aluminum compound at a pH of from 9 to 9.5, impregnating said hydrated alumina with a quantity of a chromium compound selected from the group chromic acid, ammonium chromate and ammonium bichromate such as to introduce about 10% to 30% of Cr₂O₃ on the weight of the finished catalyst, homogenizing the impregnated alumina to an extent corresponding to that obtained by passing it through a homogenizing valve at a pressure drop not greater than about 1000 p.s.i., drying it to a moisture content of about 20–30%, and calcining the resulting gel at about 1100°–1300° F. until it is substantially moisture free.

4. A method of producing a low density hydroforming catalyst which comprises precipitating hydrated alumina from an aqueous solution of a water-soluble aluminum compound at a pH from 9 to 9.5, impregnating said hydrated alumina with a quantity of ammonium molybdate such as to introduce about 8–20% of MoO₃ on the weight of the finished catalyst, homogenizing the impregnated alumina to an extent corresponding to that obtained by passing it through a homogenizing valve at a pressure drop not greater than about 1000 p.s.i., drying it to a moisture content of about 20–30%, and calcining the resulting gell at about 1100°–1300° F. until it is substantially moisture free.

5. A method of producing a high density microspheroidal catalyst which comprises precipitating hydrated alumina from an aqueous solution of a water-soluble aluminum compound at a pH of from 9.5 to 10.5, aging the resulting slurry at a higher pH between 10 and 11 for at least one-half hour, impregnating the resulting hydrated alumina with an activating metal compound, homogenizing the impregnated alumina to an extent corresponding to that obtained by passing it through a homogenizing valve at a pressure drop between 1000 and about 3000 p.s.i., converting the homogenized hydrated alumina into microspheres having a moisture content of about 20–30% by spraying it into a current of hot gases, and calcining said microspheres at about 1100°–1300° F. until they are substantially moisture free.

6. A method of producing a hydrodesulfurization catalyst having a bulk density within the range of 0.5 to 0.8 gram per cc. which comprises precipitating hydrated alumina from an aqueous solution of a water-soluble aluminum compound at a pH of from 9.5 to 10, aging the resulting slurry at a higher pH between 10.0 and 10.4 for at least one-half hour, impregnating the resulting hydrated alumina with a water-soluble molybdate and a water-soluble cobalt salt in quantities such as to introduce about 10–25% of $MoO_3$ and 1–5% of CoO on the weight of the finished catalyst, converting the impregnated alumina into a dried gel having a moisture content of about 20–40% after homogenizing it to an extent such that the apparent bulk density of the dried gel is about 0.4 to 0.45 gram per cc. and calcining the dried gell at about 1200°–1300° F. for at least one hour.

7. A method of producing a hydrodesulfurization catalyst having an apparent bulk density within the range of 0.5 to 0.8 gram per cc. which comprises precipitating hydrated alumina by introducing separate streams of aqueous sodium aluminate solution and aqueous aluminum sulfate solution into a reaction vessel at rates such as to maintain therein a pH of from 9.5 to 10 while adding sufficient water to maintain a solids content of about 7%, aging the resulting slurry at a higher pH between 10.0 and 10.4 for at least one-half hour and then filtering and washing the filter cake substantially free from salts, impregnating the resulting hydrated alumina with a water-soluble molybdate and a water-soluble cobalt salt in quantities such as to introduce about 10–20% of $MoO_3$ and 1–5% CoO on the weight of the finished catalyst, converting the impregnated alumina into a dried gel having a moisture content of about 20–40% after homogenizing it to an extent such that the apparent bulk density of the dried gel is about 0.4 to 0.45 gram per cc., pelleting the dried gel and calcining the pellets at about 1200°–1300° F. for at least one hour.

8. A hydrodesulfurization catalyst to be used in a process in which there is a net consumption of hydrogen of improved weight activity comprising on a dry weight basis about 10–25% of molybdic oxide, about 1–5% of cobalt oxide and the balance substantially all alumina, said catalyst after pelleting and calcining at 1150°–1350° F. for at least one hour having an apparent bulk density of from 0.5 to 0.8 gram per cc.

9. A hydrodesulfurization catalyst to be used in a process in which there is a net consumption of hydrogen of improved weight activity comprising on a dry weight basis about 15% of molybdic oxide, about 3% of cobalt oxide and the balance substantially all alumina, said catalyst after pelleting and calcining at 1150°–1350° F. for at least one hour having an apparent bulk density of from 0.5 to 0.8 gram per cc.

References Cited in the file of this patent

UNITED STATES PATENTS

| | | |
|---|---|---|
| 2,590,833 | Bechtold | Apr. 1, 1952 |
| 2,657,115 | Ashley | Oct. 27, 1953 |
| 2,755,257 | Donovan et al. | July 17, 1956 |
| 2,768,125 | Ashley et al. | Oct. 23, 1956 |
| 2,773,839 | Stover et al. | Dec. 11, 1956 |
| 2,773,845 | Stover et al. | Dec. 11, 1956 |
| 2,800,429 | Porter | July 23, 1957 |
| 2,838,375 | Teter | June 10, 1958 |

UNITED STATES PATENT OFFICE
CERTIFICATE OF CORRECTION

Patent No. 2,980,632                                   April 18, 1961

Thomas J. Malley et al.

It is hereby certified that error appears in the above numbered patent requiring correction and that the said Letters Patent should read as corrected below.

Column 6, line 75, for "was aqueous solution" read -- from aqueous solutions --; column 7, line 56, for "1%" read -- 10% --; column 13, line 26, for "gell" read -- gel --.

Signed and sealed this 17th day of October 1961.

(SEAL)
Attest:

ERNEST W. SWIDER                                          DAVID L. LADD
Attesting Officer                                            Commissioner of Patents
                                                                                       USCOMM-DC